United States Patent [19]

Funk et al.

[11] Patent Number: 5,777,017
[45] Date of Patent: Jul. 7, 1998

[54] AQUEOUS ORGANOPOLYSILOXANE EMULSIONS AND EMULSIFIERS FOR THEIR PREPARATION

[75] Inventors: Enno Funk, Neuhauser; Christine Kuermeier, Ahornweg, both of Germany

[73] Assignee: Wacker-Chemie GmbH, Munich, Germany

[21] Appl. No.: 712,062

[22] Filed: Sep. 11, 1996

[30] Foreign Application Priority Data

Sep. 21, 1995 [DE] Germany ............ 195 35 005.7

[51] Int. Cl.$^6$ ............ C08K 5/06; C08L 29/04; C09K 3/18; B01J 13/00
[52] U.S. Cl. ............ 524/375; 106/2; 106/287.14; 106/287.15; 252/312; 524/503
[58] Field of Search ............ 252/312, 351; 106/2, 287.14, 287.15; 524/503, 506, 375

[56] References Cited

U.S. PATENT DOCUMENTS

| | | | |
|---|---|---|---|
| 3,094,500 | 6/1963 | Herman | 524/503 |
| 3,476,827 | 11/1969 | Engelhardt | 524/503 |
| 3,900,617 | 8/1975 | Grenoble | 427/387 |
| 4,190,688 | 2/1980 | Traver et al. | 427/391 |
| 4,292,434 | 9/1981 | Lindner et al. | 556/479 |
| 4,320,041 | 3/1982 | Abe et al. | 524/503 |
| 4,433,007 | 2/1984 | Marwitz et al. | 524/506 X |
| 4,624,900 | 11/1986 | Fau | 428/447 |
| 4,791,029 | 12/1988 | Fau et al. | 428/447 |
| 4,814,167 | 3/1989 | Wirth et al. | 252/312 X |
| 4,954,539 | 9/1990 | Cavezzan et al. | 524/27 |
| 5,095,067 | 3/1992 | Hara et al. | 524/506 |
| 5,104,927 | 4/1992 | Hara et al. | 524/731 |
| 5,241,034 | 8/1993 | Herzig et al. | 528/15 |
| 5,443,627 | 8/1995 | Von Au et al. | 106/2 |
| 5,449,712 | 9/1995 | Gierke et al. | 252/312 X |
| 5,496,961 | 3/1996 | Dauth et al. | 556/9 |
| 5,548,053 | 8/1996 | Weidner et al. | 528/14 |
| 5,567,347 | 10/1996 | Kosal et al. | 106/287.14 X |

FOREIGN PATENT DOCUMENTS

| | | |
|---|---|---|
| 1246270 | 12/1988 | Canada. |
| 0117607 | 9/1984 | European Pat. Off.. |
| 0110370 | 4/1987 | European Pat. Off.. |
| 0253747 | 1/1988 | European Pat. Off.. |
| 0350413 | 1/1990 | European Pat. Off.. |
| 0484001 | 5/1992 | European Pat. Off.. |
| 0385342 | 6/1994 | European Pat. Off.. |
| 2601159 | 7/1977 | Germany. |
| 4123423 | 1/1993 | Germany. |
| 4216139 | 11/1993 | Germany. |
| 4423195 | 1/1996 | Germany. |
| 2016494 | 9/1979 | United Kingdom. |
| 9219671 | 11/1992 | WIPO. |

OTHER PUBLICATIONS

Derwent Abstract For DE 2601159; AN-77-50378Y [29] (1995).

*Primary Examiner*—Richard D. Lovering
*Attorney, Agent, or Firm*—Brooks & Kushman

[57] ABSTRACT

Aqueous organopolysiloxane emulsions, especially those which can be crosslinked by addition of Si-bonded hydrogen onto aliphatic multiple bond, their preparation with an emulsifier combination comprising alkylphenyl polyglycol ether and polyvinyl alcohol with a low degree of hydrolysis, and their use for preparing anti-adhesive coatings.

12 Claims, No Drawings

AQUEOUS ORGANOPOLYSILOXANE EMULSIONS AND EMULSIFIERS FOR THEIR PREPARATION

FIELD OF INVENTION

The invention relates to aqueous organopolysiloxane emulsions, especially those which can be crosslinked by adding Si-bonded hydrogen onto aliphatic multiple bond, to their preparation with an emulsifier combination, and to their use for producing anti-adhesive coatings.

BACKGROUND OF INVENTION

Organopolysiloxanes are of great interest for the anti-adhesive coating of a large number of substrates, for example paper, polyethylene-laminated paper or polyester film. Organopolysiloxanes have acquired importance in the production of release liners for adhesive bonds, especially for self-adhesive labels and for the production of adhesive tapes. With regard to the vulcanization system, in most cases addition-crosslinking organopolysiloxanes have established themselves over those which crosslink by condensation.

Owing to their low viscosity, aqueous organopolysiloxane emulsions can be processed on relatively simple and inexpensive coating machines, for example using an engraving roll, sizing press or doctor blade. This advantage is generally maintained irrespective of the viscosity of the oil phase, which can be varied over a wide range. In contrast to the solutions of organopolysiloxanes and organic solvents, the external phase of aqueous organopolysiloxane emulsions is toxicologically unobjectionable, noncombustible and environmentally neutral. For the preparation, stability and processing properties of aqueous organopolysiloxane emulsions, the choice of appropriate emulsifiers is of critical importance. Thus, the flow property of the ready-to-use formulation on the relevant substrate and the anchoring of the silicone coat following vulcanization are influenced decisively by the emulsifier. The nature and quantity of emulsifier also have an effect on the level of release force with respect to adhesives.

For example, EP-A 117 607 describes siloxane-polyvinyl alcohol compositions where the polyvinyl alcohol (PVA) has a hydrolysis number of 88 mol-%. In this case, a high concentration of PVA brings about high release forces. In EP-B 385 342 an improvement is found in gloss, water repellency and release force of the cured silicone coat if the emulsifier employed is a polyvinyl alcohol with a degree of hydrolysis of at least 90 mol-%.

Organopolysiloxane emulsions with emulsifier combinations comprising, PVA and alkylphenyl polyglycol ethers are already known, the degree of hydrolysis of the polyvinyl alcohols described being at least 85 mol-%. Reference may be made for example, to CA 1246270 (General Electric Co.; issued on Dec. 6, 1988), U.S. Pat. No. 5,095,067, U.S. Pat. No. 5,104,927, EP-A 484 001, U.S. Pat. No. 4,791,029, DE-B 26 01 159 and U.S. Pat. No. 3,900,617.

Also known are condensation-crosslinking organopolysiloxane emulsions, as described in U.S. Pat. No. 4,624,900, which comprise polyvinyl alcohol with a degree of hydrolysis of more than 85 mol-% and alkylphenyl polyglycol ethers. U.S. Pat. No. 4,190,688 describes an addition- and/or condensation-crosslinkable hybrid system in which the polyvinyl alcohol, which is not specified in great detail, and the alkylphenyl polyglycol ether are employed separately for emulsification of the catalyst component and of the crosslinking component.

SUMMARY OF INVENTION

The term "organopolysiloxanes" in the present invention comprises polymeric, oligomeric and dimeric organosiloxanes and also copolymers comprising organosiloxane blocks and hydrocarbon blocks.

The present invention provides compositions comprising alkylphenyl polyglycol ethers and polyvinyl alcohol with a degree of hydrolysis of not more than 85 mol-% and with a molecular weight of from 2,000 to 500,000 g/mol.

Polyvinyl alcohol is usually prepared by hydrolysis or partial hydrolysis of polyvinyl acetate. The degree of hydrolysis indicates the molar percentage of the original acetate groups which have been hydrolyzed. Subtracting this figure from 100% gives the molar percentage of acetate groups remaining in the polyvinyl alcohol.

The polyvinyl alcohol in the novel compositions comprises those with a degree of hydrolysis of between 65 and 85 mol-%, preferably with a degree of hydrolysis of between 70 and 80 mol-%, more preferably between 75 and 79 mol-%.

With a low degree of hydrolysis, the polyvinyl alcohol employed in accordance with the invention preferably has a molecular weight of from 5,000 to 100,000 g/mol.

The molecular weight is determined by gel permeation chromatography and laser light scattering as described, for example, in D. J. Nagy, International Microscopy Laboratory: Vol. 6, March 1995, pages 6 to 11.

The polyvinyl alcohol with a low degree of hydrolysis which is present in the novel composition may comprise one kind, or a mixture of at least two kinds, of polyvinyl alcohols. Polyvinyl alcohols with a low degree of hydrolysis are commercial products and/or can be prepared by known methods of organic chemistry.

The alkylphenyl polyglycol ether employed in the novel composition is preferably a compound of the formula

$$R\text{—}(C_6H_4)\text{—}O(CH_2CH_2O)_xH \qquad (I),$$

in which

R is an alkyl radical having 4 to 15 carbon atoms and x is an integer from 5 to 30, preferably from 10 to 20, and the phenyl group —$(C_6H_4)$— can be ortho-, meta- or para-substituted.

The radical R comprises linear alkyl radicals having 4 to 15 carbon atoms, preferably the n-octyl and n-nonyl radical, and more preferably the n-nonyl radical.

Examples of radicals R are 1-n-butyl, 2-n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; pentadecyl radicals, such as the n-pentadecyl radical, and also cycloalkyl radicals, such as cyclopentyl, cyclohexyl, cycloheptyl radicals and methylcyclohexyl radicals.

Examples of the alkylphenyl polyglycol ethers employed in accordance with the invention are n-nonylphenyl polyglycol ethers having on average 15 glycol units, n-nonylphenyl polyglycol ethers having on average 20 glycol units, n-pentadecylphenyl polyglycol ethers having on average 25 glycol units and n-octylphenyl polyglycol ethers having on average 10 glycol units, with preference being given to n-nonylphenyl polyglycol ethers having on average 15 glycol units.

The alkylphenyl polyglycol ether present in the novel composition may comprise one kind, or else a mixture of at least two kinds, of alkylphenyl polyglycol ethers.

Alkylphenyl polyglycol ethers are commercial products and/or can be prepared by known methods of organic chemistry.

The novel compositions comprise polyvinyl alcohol with a low degree of hydrolysis and alkylphenyl polyglycol ether in a weight ratio of from 3:1 to 6:1, preferably from 4:1 to 5.5:1.

The novel compositions can comprise further substances, such as water, low molecular mass alcohols, for example hexanol, or low molecular mass glycols, for example ethylene glycol, propylene glycol, diethylene glycol and triethylene glycol, and in addition preferably contain no other substances.

The novel compositions are employed as an emulsifier combination.

The present invention additionally provides aqueous emulsions based on organopolysiloxanes, which comprise as emulsifier the novel compositions.

The novel aqueous emulsions based on organopolysiloxanes comprises the novel compositions in a quantity based on 100 parts by weight of organopolysiloxanes (oil phase) there are from 2 to 25 parts by weight, preferably from 3 to 10 parts by weight, of polyvinyl alcohol with a low degree of hydrolysis and from 0.1 to 2 parts by, weight, preferably from 0.5 to 1.5 parts by weight, of alkylphenyl polyglycol ether.

The novel aqueous emulsions based on organopolysiloxanes have the advantage that they give outstanding wetting of the substrate to be coated, for example paper, polymer films, woven fabric, finewoven fabric or textiles, impregnate these substrates and become anchored thereon in an abrasion-resistant manner.

The novel emulsions may comprise any desired emulsions known which are based on organopolysiloxanes. The novel, organopolysiloxane-based emulsions are preferably those of the oil-in-water type.

The novel aqueous emulsions are preferably those which can be crosslinked by addition of Si-bonded hydrogen onto aliphatic multiple bond, comprising (A) organopolysiloxanes comprising radicals with aliphatic carbon-carbon multiple bonds, and (B) organopolysiloxanes with Si-bonded hydrogen atoms or, (C) organopolysiloxanes where radicals with aliphatic carbon-carbon multiple bonds and Si-bonded hydrogen atoms are present in the same organopolysiloxane molecule, and (D) catalyst which promotes the addition of Si-bonded hydrogen onto aliphatic multiple bond, (E) novel emulsifier combination and, optionally, (F) inhibitor.

The constituents (A), (B), (C), (D) and (F) employed to produce the novel emulsions can be the same constituents which have been employed in compositions which can be crosslinked by the addition of Si-bonded hydrogen onto aliphatic multiple bond. Reference is made to the German application, file reference P 44 23 195.4 (Wacker-Chemie GmbH; filed on Jul. 1, 1994) or corresponding U.S. Pat. No. 5,496,961, issued on Mar. 5, 1996.

Individual components employed to produce the novel compositions, may comprise one single type of a component or a mixture of at least two different types of a component.

Since the novel, polyaddition-crosslinkable emulsion generally has a limited pot life, an aqueous organopolysiloxane emulsion is prepared and stored in the form of two different emulsion components, the term pot life referring to the period during which complete curing of the emulsion is ensured. For instance, the two emulsion components of the novel crosslinkable emulsion can comprise all constituents in any desired combinations and proportions, with the proviso that one component does not comprise simultaneously the constituents (A), (B) and (D) or (C) and (D). Preferably, constituent (B) and (D) are present separated from each other in the oil phases of these components. With particular preference, the oil phase of the emulsion component referred to below as crosslinking component comprises a mixture of constituent (A), (B) and, optionally, (F), while the oil phase of the emulsion component referred to below as catalyst component comprises a mixture of constituent (A) and (D).

As organopolysiloxane (A) which contain SiC-bonded radicals with aliphatic carbon-carbon multiple bonds it is preferred to employ linear or branched organopolysiloxanes comprising units of the formula

 (II)

where $R^1$ is a monovalent, SiC-bonded, substituted or unsubstituted hydrocarbon radical having 1 to 18 carbon atoms which is free from aliphatic carbon-carbon multiple bonds, $R^2$ is a monovalent hydrocarbon radical having 2 to 18 carbon atoms which has an aliphatic carbon-carbon multiple bond, a is 0, 1, 2 or 3, and b is 0, 1 or 2, with the proviso that the sum of a+b is less than or equal to 3 and that on average there are at least two radicals $R^2$ per molecule.

The organopolysiloxanes (A) possess an average viscosity of from 10 to 30,000 mm$^2$/s at 25° C., preferably between 200 and 7,000 mm$^2$/s.

Examples of hydrocarbon radicals $R^1$ are alkyl radicals such as the methyl, ethyl, n-propyl, isopropyl, 1-n-butyl 2-n-butyl, isobutyl, tert-butyl, n-pentyl, isopentyl neopentyl, tert-pentyl radical, hexyl radicals, such as the n-hexyl radical, heptyl radicals, such as the n-heptyl radical octyl radicals, such as the n-octyl radical and isoocty radicals, such as the 2,2,4-trimethylpentyl radical, nony radicals, such as the n-nonyl radical, decyl radicals, such a the n-decyl radical, octadecyl radicals, such as th n-octadecyl radical, cycloalkyl radicals, such as cyclopentyl cyclohexyl, cycloheptyl radicals and methylcyclohexy radicals, unsaturated radicals, such as the allyl, 5-hexenyl 7-octenyl, 9-decenyl, 11-dodecenyl, cyclo-hexenyl an styryl radical, aryl radicals, such as o-, m-, p-tolyl radical; xylyl radicals and ethylphenyl radicals and aralkyl radical; such as the benzyl radical, the α- and β-phenylethyl radica Examples of substituted hydrocarbon radicals $R^1$ ar haloalkyl radicals, such as the 3,3,3-trifluoro-n-prop$ radical, the 2,2,2,2',2'-hexafluoroisopropyl radical and th heptafluoroisopropyl radical, and also haloaryl radical; such as the o-, m- and p-chlorophenyl radical.

The radical $R^1$ preferably comprises alkyl radicals havin 1 to 8 carbon atoms, with more preference being given to th methyl radical.

Examples of radicals $R^2$ are alkenyl radicals, such as th vinyl, allyl, 3-butenyl, 4-pentenyl radical, 5-hexenyl radica 6-heptenyl radical, 7-octenyl radical and 11-dodecenyl rad cals and also alkynyl radicals, such as the ethynyl, proparg; and 1-propynyl radical, with preference to the viny 5-hexenyl and propargyl radical and more preference to th vinyl radical.

Organopolysiloxane (A) preferably comprises linear siloxanes of the formula $$R^2R^1{}_2Si\text{—}O\text{—}(R^1{}_2SiO)_r\text{—}(R^2R^1SiO)_s\text{—}SiR^1{}_2R^2 \quad (III),$$

where $R^1$ and $R^2$ are each as defined above, r is an integer between 40 and 700, preferably between 10 and 200, and s is 0 or an integer from 1 to 20, preferably 0 or an integer from 1 to 5, in particular 0.

Where s in formula (III) is other than 0, the distribution of the $R^2R^1SiO$ units in the polymer chains is arbitrary. The stoichiometric coefficients r and s can each be mean values.

The siloxanes (A) employed in accordance with the invention can comprise alkenyl-containing siloxane copolymers according to U.S. Pat. No. 5,241,034 (Wacker-Chemie GmbH; issued on Aug. 31, 1993) or the corresponding DE-A 41 23 423. Organopolysiloxane (B) containing Si-bonded hydrogen atoms is preferably linear, cyclic or branched organopolysiloxanes comprising units of the formula $$\frac{R_c{}^1H_dSiO_{4-c-d}}{2} \quad (IV)$$

in which $R^1$ is as defined above, c is 0, 1, 2 or 3 and d is 0, 1 or 2, with the proviso that the sum of c+d is less than or equal to 3 and that on average there are at least two Si-bonded hydrogen atoms per molecule.

The organopolysiloxanes (B) have an average viscosity of from 10 to 1,000 mm²/s at 25° C., preferably between 10 and 100 mm²/s, in particular between 20 and 60 mm²/s.

The organopolysiloxanes (B) preferably have a hydrogen content of at least one percent by weight.

The organopolysiloxane (B) employed in accordance with the invention preferably comprises those of the formula $$R^1{}_3Si\text{—}O\text{—}(R^1{}_2SiO)_t\text{—}(HR^1SiO)_u\text{—}SiR^1{}_3 \quad (V),$$

in which $R^1$ is as defined above, t is an integer between 10 and 200, preferably between 20 and 100, and u is an integer between 5 and 100, preferably between 10 and 50.

The distribution of the $HR^1SiO$ units in formula (V) throughout the polymer chains is arbitrary. The stoichiometric coefficients t and u can each be mean values.

The siloxanes (B) are hydrogen-rich polyorganohydridosiloxanes (B') of the formula (V) with a ratio of t:u of more than 2:1, preferably with a ratio of t:u of greater than or equal to 3:1 and with a hydrogen content of from 1.1% to 1.7% by weight.

The quantitative ratio of polyorganohydridosiloxane (B) to aliphatically unsaturated polyorganosiloxane (A) depends on the number of aliphatically unsaturated radicals in the siloxane (A). To ensure complete crosslinking of the novel emulsion, an excess of silicon-bonded hydrogen to SiC-bonded aliphatically unsaturated radicals is employed. In the novel emulsions, the numerical ratio of Si-bonded hydrogen of siloxane (B) to SiC-bonded aliphatically unsaturated radicals of siloxane (A) is preferably from 1.5:1 to 3:1.

In the novel crosslinking components the content of organopolysiloxane (B), containing Si-bonded hydrogen, is from 1.5 to 10 parts by weight, preferably from 2 to 5 parts by weight, based on 100 parts by weight of polyorganosiloxane (A).

Organopolysiloxanes (C), which contain aliphatic carbon-carbon multiple bonds and Si-bonded hydrogen atoms which can be used in place of organopolysiloxanes (A) and (B), are preferably those comprising units of the formula $$\frac{R_k{}^1SiO_{4-k}}{2} \cdot \frac{R_l{}^1R^2SiO_{3-l}}{2} \text{, and } \frac{R_p{}^1HSiO_{3-p}}{2}$$

where $R^1$ and $R^2$ are as defined above, k is 0, 1, 2 or 3, l is 0, 1 or 2 and p is 0, 1 or 2, with the proviso that on average at least two radicals $R^2$ and on average at least two Si-bonded hydrogen atoms are present per molecule.

Examples of organopolysiloxanes (C) are those comprising $SiO_{4/2}$, $R^1{}_3SiO_{1/2}$, $R^1{}_2R^2SiO_{1/2}$ and $R^1{}_2HSiO_{1/2}$ units, MQ resins, which may additionally comprise $R^1SiO_{3/2}$ and $R^1{}_2SiO$ units and where $R^1$ and $R^2$ are as defined above.

The organopolysiloxanes (C) preferably have an average viscosity of from 10 to 100,000 mm²/s at 25° C. or are solids with molecular weights of from 5,000 to 50,000 g/mol.

In the siloxanes (C) which are employed in the novel emulsions in place of siloxane (A) and siloxane (B) the numerical ratio of Si-bonded hydrogen to SiC-bonded aliphatically unsaturated radicals is preferably from 1.5:1 to 3:1.

The catalysts (D) which are employed in the novel emulsions comprise a metal from the group of the platinum metals or a compound or a complex from the group of the platinum metals. Examples of such catalysts are metallic and finely divided platinum, which may be on supports such as silica, alumina or active charcoal, compounds or complexes of platinum, such as platinum halides, for example $PtCl_4$, $H_2PtCl_6\cdot 6H_2O$, $Na_2PtCl_4\cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6\cdot 6H_2O$ and cyclohexanone, platinum-vinylsiloxane complexes, such as platinum-1,3-divinyl-1,1,3,3-tetramethyldisiloxane complexes with or without a content of the detectable inorganically bonded halogen, bis(γ-picoline)platinum dichloride, trimethylenedipyridineplatinum dichloride, dicyclopentadieneplatinum dichloride, dimethyl sulfoxide-ethyleneplatinum(II) dichloride, cyclooctadieneplatinum dichloride, norbornadieneplatinum dichloride, γ-picolineplatinum dichloride, cyclopentadieneplatinum dichloride and reaction products of platinum tetrachloride with olefin and primary amine or secondary amine or primary and secondary amine according to U.S. Pat. No. 4,292,434, such as the reaction product of platinum tetrachloride dissolved in 1-octene with sec-butylamine, or ammonium-platinum complexes according to EP-B 110 370. In addition, catalyst (D) may comprise a platinum complex according to the already cited German application P 44 23 195.4.

Preferred catalysts (D) are platinum-1,3-divinyl-1,1,3,3-tetramethyldisiloxane complexes and platinum complexes according to the above-cited German application P 44 23 195.4.

The platinum catalyst (D) is employed in concentrations of from 10 to 500 ppm by weight, calculated as elemental platinum and based on the overall quantity of organopolysiloxane (A) in the novel crosslinkable emulsion.

In the novel catalyst component the concentration of the catalyst (D) can be within wide limits, for example between 5 and 10,000 ppm by weight, calculated as elemental platinum and based on the quantity or organopolysiloxane (A) in the catalyst component, the concentration of catalyst preferably being from 50 to 2,000 ppm by weight, calculated as elemental platinum and based on the quantity of organopolysiloxane (A) in the catalyst component.

For greater ease of processing, and to prolong the pot life, inhibitors are often employed in addition to the above mentioned catalysts. The inhibitors (F) employed can be known compounds which delay the addition of the Si-bonded hydrogen onto aliphatic multiple bond. Examples of inhibitors are 1,3-divinyl-1,1,3,3-tetramethyldisiloxane, benzotriazole, dialkylformamides, alkylthioureas, methyl ethyl ketoxime, organic or organosilicon compounds with a boiling point of at least 25° C. at 1012 hPa and at least one aliphatic triple bond, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, a mixture of diallyl maleate and vinyl acetate, and maleic monoesters.

If inhibitor (F) is employed it comprises alkynols, for example 2-methyl-3-butyn-2-ol or 1-ethynylcyclohexanol.

The novel emulsions contain from 0.1% to 0.5% by weight of inhibitor (F) based on the overall quantity of polyorganosiloxane (A).

If inhibitor (F) is employed in the novel crosslinking component, the quantities involved being from 0.05% to 10% by weight, preferably from 0.1% to 1% by weight, based on the oil phase of the novel crosslinking component.

The novel emulsions can comprise organopolysiloxane resin according to DE-A 42 16 139 (Wacker-Chemie GmbH; published on Nov. 18, 1993) or the corresponding U.S. application Ser. No. 08/313,192.

These resins are organopolysiloxane resins, are MQ resins with an average molecular weight of from 500 to 10,000 g/mol, of the formula

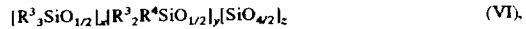

where $R^3$ can be identical or different and is defined for $R^1$.

$R^4$ can be identical or different and is defined for $R^2$.

z is other than 0.

x is 0 or a number.

y is 0 or a number.

with the proviso that the ratio of (x+y):z is from 0.6:1 to 1:1.

If y in formula (VI) is other than 0, which is preferred, the ratio of x:y is from 98:2 to 60:40.

Organopolysiloxane resins according to formula (VI) are known and can be prepared, by the procedure described in the above mentioned DE-A 42 16 139.

Where the organopolysiloxane resins of the formula (VI) which are optionally employed comprise, in whole or in part, those where y is other than 0, they can replace the aliphatically unsaturated polyorganosiloxane (A) employed in accordance with the invention, provided component (A) is not already a resin of the formula (VI).

If organopolysiloxane resins are employed to prepare the novel emulsions, they are present in the crosslinking component. Crosslinking components comprising organopolysiloxane resin of formula (VI) will be referred to below as release crosslinking components.

The content of siloxane resin in the oil phase of a release crosslinking component is from 50% to 90% by weight, preferably from 65% to 85% by weight, based on the overall weight of the oil phase.

In addition, the oil phase of the novel release crosslinking component may contain up to 30% by weight of an organic solvent. Examples of such organic solvents are aromatic hydrocarbons, such as toluene or xylene, aliphatic hydrocarbons, such as hexane, n-heptane, n-octane, isooctane, octene, octadiene, undecene, dodecene, dodecadiene, tridecene or octadecene, and aliphatic or araliphatic ethers, such as dibutyl ether or anisole, and also mixtures of the above mentioned solvents, with preference being given to unsaturated hydrocarbons such as undecene, dodecene and tridecene.

The novel emulsions can comprise customary additives, for example preservatives, such as formalin and quaternary ammonium salts, and also thickeners, such as carboxymethylcellulose and hydroxyethylcellulose. The novel emulsions comprise no further substances over and above these.

The individual novel emulsion components are preferably prepared by emulsifying the respective oil phases in water in the presence of the novel composition, consisting of a polyvinyl alcohol with a low degree of hydrolysis and an alkylphenyl polyglycol ether.

The novel catalyst components and crosslinking components each comprise, independently of one another, the novel compositions, in a quantity, based on 100 parts by weight of organopolysiloxanes (oil phase), there are from 2 to 25 parts by weight, preferably from 3 to 10 parts by weight, of polyvinyl alcohol with a low degree of hydrolysis and from 0.1 to 2 parts by weight, more preferably from 0.5 to 1.5 parts by weight, of alkylphenyl polyglycol ether.

The novel release crosslinking components comprise the novel compositions in a quantity, based on 100 parts by weight of organopolysiloxanes (oil phase), there are from 4 to 25 parts by weight, preferably from 6 to 8 parts by weight of polyvinyl alcohol with a low degree of hydrolysis and from 0.5 to 3 parts by weight, more preferably from 1 to 2 parts by weight, of alkylphenyl polyglycol ether.

To prepare the novel crosslinkable emulsions the crosslinking component is then mixed with the catalyst component.

Where additives are employed in the preparation of the novel emulsions they can be added, depending on the nature of the additive, in any desired manner including, optionally in the form of a solution or emulsion.

Emulsification can take place in customary mixing apparatus appropriate for the preparation of emulsions, for example high-speed stator-rotor stirrers according to Prof. Willems, known under the trade name "Ultra-Turrax". Reference is also made, to Ullmanns Encyklopädie der Technischen Chemie, Urban & Schwarzenberg, Munich, Berlin 3rd Edition, Volume 1, page 720 ff.

The volume ratio of crosslinking component to catalyst component (so-called packing design) can be varied over a wide range for a given silicone content. The volume ratio of crosslinking component to catalyst component is preferably from 10:1 to 1:10, preferably from 10:1 to 1:1. Where release crosslinking component is employed for the preparation of the novel crosslink-able emulsions, the volume ratio of release crosslinking component, mixed optionally with crosslinking component without a resin fraction on the one hand and catalyst component on the other hand, is, particular, from 10:1 to 5:1, but can also be 1:1.

It is also possible to employ blends of crosslinking component, containing no resin of the formula (VI), and release crosslinking component in any desired mixing ratio with one another, depending on application. By this mea it is possible, to provide for infinite adjustment of the level of release force of the cured siloxane coating relative to adhesives, within the limits defined by the use of the pure crosslinking component without resin or of the pure release crosslinking component.

The novel crosslinkable emulsions can be employed for all purposes for which aqueous emulsions based on organopolysiloxanes have also been employed. The novel, addition-crosslinkable emulsions are particularly suitable for the production of release coatings against adhering articles. Thus they are suitable, for the production of release, backing and interleaving papers, including interleaving papers which are employed in the production of, cast films or decorative films, or of foams, including those of polyurethane. The novel crosslinkable emulsions are additionally suitable, for the production of release, backing and interleaving cards, films and cloths, for treating the reverse faces of self-adhesive tapes or self-adhesive films or the text-bearing faces of self-adhesive labels. The novel crosslinkable emulsions are also suitable for treating packaging material, such as that comprising paper, cardboard boxes, metal foils and drums, for example cardboard, plastic, wood or iron, which is or are intended for the storage and/or transportation of tacky goods, such as adhesives, sticky foodstuffs, for example cakes, honey, candies and meat, bitumen, asphalt, greased materials and crude rubber. A further example of the use of the novel crosslinkable emulsions is the treatment of supports for the transfer of contact adhesive layers in the transfer process.

The novel addition-crosslinkable emulsions are suitable for the production of the self-adhesive materials connected to the release paper, both by the off-line method and by the in-line method.

The novel addition-crosslinkable emulsions may be applied to the surfaces which are to be rendered repellent to tacky substances which is suitable for the production of coatings of liquid substances, for example by dipping, brushing, flow coating, spraying, rolling or printing, by means of an offset gravure coating apparatus, by knife or doctor-blade coating or using an airbrush.

The surfaces which are to be rendered repellent to tacky substances and which can be treated within the scope of the invention may be surfaces of any substances which are solid at room temperature and at from 900 to 1100 hPa. Examples of such surfaces are those of paper, wood, cork and polymer films, for example polyethylene films or polypropylene films, woven and nonwoven cloth of natural or synthetic fibers or glass fibers, ceramic articles, glass, metals, polyethylene-coated paper, and boards, including those of asbestos. The polyethylene may be high-pressure, medium-pressure or low-pressure polyethylene. The paper may comprise low-grade papers, such as absorbent papers, including raw—i.e. not pretreated with chemicals and/or with polymeric natural substances—kraft paper having a weight of from 60 to 150 g/m$^2$, unsized papers, papers of low freeness value, mechanical papers, unglazed or uncalendered papers, papers which are smooth on one side owing to the use of a dry glazing cylinder during their production, without additional complex measures, and are referred to as "machine-glazed papers", uncoated papers or papers produced from waste paper, i.e. so-called recycled papers. The paper to be treated in accordance with the invention may also comprise high-grade papers, such as low-absorbency papers, sized papers, papers of high freeness value, chemical papers, calendered or glazed papers, glassine papers, parchmentized papers or precoated papers. Cards and boards may also be of low or high grade.

The novel addition-crosslinkable organopolysiloxane emulsions cure within a short time following evaporation of the solvent, i.e. of the water and any organic solvent, to form elastomers.

The novel addition-crosslinkable emulsions are crosslinked at from 50° to 220° C., preferably from 60° to 180° C., under a pressure of from 900 to 1,100 hPa.

For crosslinking by heating, energy sources used are ovens, for example convection ovens, heating tunnels, heated rollers, heated plates or heat rays in the infra-red region.

The novel addition-crosslinkable emulsions, especially those comprising hydrogen-rich polyorganosiloxanes (B'), have the advantage that they can be used to produce an outstanding covering on substrates.

The novel addition-crosslinkable emulsions, especially those comprising hydrogen-rich polyorganosiloxanes (B'), have the advantage that they possess excellent flow properties and very good wetting properties, that very low release force values can be obtained on release papers and that high abrasion resistance values are attained. A further advantage is that the curing of the novel emulsions takes place within a very short time at a given temperature.

Another advantage of the novel addition-crosslinkable emulsions is that they are stable with respect to coalescence for at least one year when stored at 25° C. under the pressure of the surrounding atmosphere.

In the examples described below all parts and percentages are by weight unless stated otherwise. The examples below are, unless stated otherwise, carried out at the pressure of the surrounding atmosphere, at about 1.000 hPa and at room temperature, at about 23° C., or at the temperature which is established during preparation of the emulsion without additional heating and cooling.

To prepare the emulsions, use is made of a stator-rotor stirrer obtainable under the trade name "Ultra-Turrax" T50 from Janke & Kunkel, D-79219 Staufen, fitted with dispersing tool S50-G45M.

The stability of the emulsions is determined by the test with a centrifuge, obtainable under the trade name "Varifuge GL" from Heraeus Christ at 4,000 rpm (revolutions per minute) for 1 hour. Thereafter, the deposition of water and, optionally, of oil is measured in ml. The particle size is measured by laser scattered-light analysis on an instrument obtainable under the trade name "Autosizer 2c" from M utex, Herrsching.

"Polyvinyl alcohol I" is a polyvinyl alcohol with a degree of hydrolysis of from 75.0 to 79.0 mol-% and an average molecular weight of 16,000 g/mol (commercially available under the registered trade mark "Polyviol" V03/240 from Wacker-Chemie GmbH, Munich).

"Polyvinyl alcohol II" is a polyvinyl alcohol with a degree of hydrolysis of from 86.0 to 89.0 mol-% and an average molecular weight of 20,000 g/mol (commercially available under the registered trade mark "Polyviol" G04/140 from Wacker-Chemie GmbH, Munich).

Nonylphenyl polyglycol ether having on average 15 glycol units is commercially available under the name "Arkopal" N-150 from Hoechst AG, Frankfurt am Main.

Example 1 a) Preparation of Crosslinking Component 1

500 parts of crosslinking oil phase 1, consisting of 478.2 parts of a linear polydimethylsiloxane having terminal dimethylvinylsilyl groups and a viscosity of 1,000 mm$^2$/s, 2.7 parts of ethynylcyclohexanol and 19.1 parts of a polymethylhydridosiloxane having a content of Si-bonded hydrogen at 1.15% and a viscosity of 40 mm$^2$/s are incorporated in 6 portions into a mixture of 120 parts of a 20% strength aqueous solution of polyvinyl alcohol I and 5 parts of nonylphenyl polyglycol ether using the Ultra-Turrax at a speed of 6,000 minute$^{-1}$. This produces a stiff phase which is subsequently diluted with 433 parts of deionized water. Finally, 1 part of 36.5% strength aqueous formaldehyde solution is stirred in as biocide. The emulsion obtained is stable in the centrifuge test and has a mean particle size of 328 nm.

b) Preparation of Catalyst Component 1

500 parts of a catalyst oil phase 1 consisting of a linear polydimethylsiloxane having terminal dimethylvinylsilyl groups and a viscosity of 1,000 mm$^2$/s and 200 ppm of a platinum-1,3-divinyl-1,1,3,3-tetramethyldisiloxane complex, calculated as elemental platinum, are incorporated in accordance with the procedure described under a) into a mixture of a 20% strength aqueous solution of 120 parts of polyvinyl alcohol I and 5 parts of nonylphenyl polyglycol ether. After dilution of the resulting stiff phase with 433 parts of deionized water and addition of 1 part of 36.5% strength aqueous formaldehyde solution, a stable emulsion with a mean particle size of 325 nm is obtained.

To prepare the crosslinkable emulsion, 10 parts of crosslinking component 1, 10 parts of catalyst component 1 and 80 parts of water are mixed with one another. The resulting emulsion is then applied using a 30 μm wire doctor blade to glassine paper with a weight of 65 g/m$^2$ (commercially available under the name "Buxil N 925" from Cartiera Bosso, Italy). The paper thus treated is then suspended in a convection oven at 150° C. for a period of 30 seconds, during which the emulsion vulcanizes on the paper to form a coat.

The applied weight of silicone, i.e. the quantity of silicone per unit area as determined by X-ray fluorescence analysis, is 1.5 g/m$^2$.

The paper thus coated is analyzed for its release force in accordance with FINAT test method 10 and for the residual adhesive force in accordance with FINAT test method 11. The release forces are measured in relation to acrylic adhesives obtainable under the designation "A 7475", rubber adhesives available under the designation "K 7476" and "Tesa 4154", each from the company Beiersdorf, Hamburg. The residual adhesive force is measured with the adhesive "Tesa 4154".

The results can be found in Table 1.

In addition, using the papers i)–v) coated with the crosslinkable emulsion, as described in Example 5, the flow properties (wetting properties) on the substrates and the anchorage to the substrate (=ruboff) are investigated, and the so-called Shirlastain test is carried out.

The results for these tests can be found in Tables 2 to 4.

Example 2 a) Preparation of Crosslinking Component 2

The procedure described in Example 1 under a) is repeated with the modification that, in place of 500 parts of crosslinking oil phase 1, 500 parts of crosslinking oil phase 2 consisting of 487.5 parts of a linear polydimethylsiloxane having terminal dimethylvinylsilyl groups and a viscosity of 1,000 mm$^2$/s, 1.4 parts of ethynylcyclohexanol and 11.1 parts of a polymethylhydridosiloxane having a content of Si-bonded hydrogen of 1.15% and a viscosity of 40 mm$^2$/s are employed. The emulsion, which is stable in the centrifuge test, has a mean particle size of 294 nm.

b) Preparation of Catalyst Component 2

The procedure described in Example 1 under b) is repeated with the modification that, in place of catalyst oil phase 1, catalyst oil phase 2 consisting of 500 parts of a polydiorganosiloxane having terminal dimethylvinylsilyl groups in a viscosity of about 500 mm$^2$/s and a content of 1,000 ppm of a platinum-1,3-divinyl-1,1,3,3-tetramethyldisiloxane complex, calculated as elemental platinum, is employed. The catalyst oil phase 2 is commercially available under the name "Katalysator C05" from Wacker-Chemie GmbH, Munich. The emulsion, which is stable in the centrifuge test, has a mean particle size of 297 nm.

To prepare the crosslinkable emulsion 18 parts of crosslinking component 2, 2 parts of catalyst component 2 and 80 parts of water are mixed with one another. The subsequent procedure is as described in Example 1.

The results can be found in Table 1.

Example 3 a) Preparation of Release Crosslinking Component 1

The procedure described in Example 1 under a) is repeated with the modification that a mixture of 170 parts of the 20% strength aqueous solution of polyvinyl alcohol I and 7 parts of nonylphenyl polyglycol ether and, in place of 500 parts of crosslinking oil phase 1, 500 parts of release crosslinking oil phase 1 consisting of 458.7 parts of a silicone resin of the formula |(CH$_3$)$_3$SiO$_{1/2}$|$_x$|(CH$_3$)$_2$(CH$_2$=CH)SiO$_{1/2}$|$_y$|SiO$_{4/2}$|$_z$ with a ratio of x:y of from 10:1 to 9:1 and (x+y):z of from 0.7 to 0.75 (commercially available under the registered trade name "CRA" 17 from Wacker-Chemie GmbH) and 41.3 parts of a polymethylhydridosiloxane having a content of Si-bonded hydrogen of 1.15% and a viscosity of 40 mm$^2$/s and that the resulting stiff phase is diluted with 405 parts of deionized water and that then one part of 36.5% strength aqueous formaldehyde solution is added.

The emulsion, which is stable in the centrifuge test, has a mean particle size of 265 nm.

To prepare the crosslinkable emulsion 9 parts of release crosslinking component 1, 9 parts of the crosslinking component 2 described in Example 2 under a), 2 parts of the catalyst component 2 described in Example 2 under b) and 80 parts of water are mixed with one another. The subsequent procedure is as described in Example 1.

The results can be found in Table 1.

Example 4

To prepare the crosslinkable emulsion, 18 parts of the release crosslinking component described in Example 3 under a), 2 parts of the catalyst component 2 described in Example 2 under b) and 80 parts of water are mixed with one another. The subsequent procedure is as described in Example 1.

The results can be found in Table 1.

TABLE 1

| Example | Release force |cN/cm| | | Residual adhesive force |%| |
|---|---|---|---|---|
| | "A 7475" | "K 7476" | "Tesa 4154" | |
| 1 | 4.9 | 15.3 | 2.1 | 126 |
| 2 | 6.9 | 11.6 | 1.5 | 105 |
| 3 | 36.3 | 67.8 | 14.7 | 123 |
| 4 | 216.5 | 232.4 | 103.9 | 103 |

Example 5 a) Preparation of Crosslinking Component 3

500 parts of crosslinking oil phase 3 consisting of 469. parts of a linear polydimethylsiloxane having terminal dim ethylvinylsilyl groups and a viscosity of 1.000 mm²/s. 2.6 parts of ethynylcyclohexanol and 28.2 parts of a polymethylhydridosiloxane having a content of Si-bonded hydrogen of 0.73% and a viscosity of 65 mm²/s are incorporated in 6 portions into a mixture of 20% strength aqueous solution of 120 parts of polyvinyl alcohol I and 5 parts of nonylphenyl polyglycol ether using the Ultra Turrax at a speed of 6.000 minute⁻¹. This produces a stiff phase which is subsequently diluted with 433 parts of deionized water. Finally, 1 part of 36.5% strength aqueous formaldehyde solution is stirred in as biocide. The resulting emulsion is stable in the centrifuge test and has an average particle size of 383 nm.

To prepare the crosslinkable emulsion 10 parts of crosslinking component 3, 10 parts of the catalyst component 1 described in Example 1 under b) and 80 parts of water are mixed with one another.

The emulsion thus obtained is then applied using a 30 μm wire doctor blade to each of the following:

i) glassine paper with a weight of 65 g/m² (commercially available under the designation "Buxil N 925" from Cartiera Bosso, Italy), ii) a clay-coated kraft paper with a weight of 135 g/m² (commercially available under the designation "Hifi Silico 609" from Papierfabriken Cham-Tenero, Cham. Switzerland), iii) a clay-coated kraft paper with a weight of 140 g/m² (commercially available under the designation "Hifi Silico 691" from Papierfabriken Cham-Tenero, Cham. Switzerland), iv) a clay-coated kraft paper with a weight of 87 g/m² (commercially available under the designation "Algro Sol 87" from Hannoverschen Papierfabriken, Alfeld-Gronau, Germany) and v) a clay-coated kraft paper with a weight of 98 g/m² (commercially available under the designation "CMC-3" from Stora Billerud, Säffle, Sweden).

The applied weight of silicone, i.e. the quantity of silicone per unit area as determined by X-ray fluorescence analysis, is in each case 1.5 g/m².

The papers thus treated are then hung for a period of 30 seconds each at 150° C. in a convection oven, the emulsion on the papers vulcanizing.

The papers thus coated are each investigated for their flow properties (wetting properties) on the substrates and for anchorage to the substrate (=ruboff), and also the so-called Shirlastain test is carried out.

In assessing the flow properties the wetting of the paper by the emulsion is first of all observed visually. Defective flow is initially indicated by pin hole craters which propagate with a greater or lesser degree of rapidity. Following vulcanization, poorly wetted areas have a mat appearance, and the different covering of the paper produced by different thicknesses of silicone coat is also evident in the coloring test by coloration patterns which are in most cases irregular.

When determining the anchorage to the substrate, the tip of the finger is rubbed rapidly backward and forward with great pressure over an area of the silicone coating, with deficient anchorage becoming evident by abraded silicone particles. Assessment is on a 6-point scale where 1=no ruboff and 6=very severe ruboff.

In the Shirlastain test, the dye solution "Shirlastain A", commercially available from Shirley Developments Ltd., UK, is caused to act for a period of 2 minutes on the surface of the silicone-coated paper, deficient coverage becoming evident by the degree of staining of the paper.

The results can be found in Tables 2–4.

Comparison Example 1
a) Preparation of Crosslinking Component C1

The procedure described in Example 5 under a) is repeated with the modification that the emulsifier employed comprises, in place of a mixture of a 20% strength aqueous solution of 120 parts of polyvinyl alcohol I and 5 parts of nonylphenyl polyglycol ether, only 120 parts of a 20% strength aqueous solution of polyvinyl alcohol I. The emulsion obtained is stable in the centrifuge test and has a mean particle size of 313 nm.

b) Preparation of Catalyst Component C1

The procedure described in Example 1 under b) is repeated with the modification that the emulsifier employed comprises, in place of a mixture of a 20% strength aqueous solution of 120 parts of polyvinyl alcohol I and 5 parts of nonylphenyl polyglycol ether, only 120 parts of a 20% strength aqueous solution of polyvinyl alcohol I. The emulsion obtained is stable in the centrifuge test and has a mean particle size of 306 nm.

To prepare the crosslinkable emulsion 10 parts of crosslinking component C1, 10 parts of catalyst component C1 and 80 parts of water are mixed with one another. The procedure described in Example 5 is then repeated with the emulsion thus obtained.

The results can be found in Tables 2–4.

Comparison Example 2
a) Preparation of Crosslinking Component C2

The procedure described in Example 1 under a) is repeated with the modification that the emulsifier employed comprises, in place of a mixture of a 20% strength aqueous solution of 120 parts of polyvinyl alcohol I and 5 parts of nonylphenyl polyglycol ether, only 120 parts of a 20% strength aqueous solution of polyvinyl alcohol I. The emulsion obtained is stable in the centrifuge test and has a mean particle size of 314 nm.

To prepare the crosslinkable emulsion 10 parts of crosslinking component C2, 10 parts of the catalyst component C1 described in Comparison Example 1 and 80 parts of water are mixed with one another. The procedure described in Example 5 is then repeated with the emulsion obtained in this way.

The results can be found in Tables 2–4.

Comparison Example 3
a) Preparation of Crosslinking Component C3

The procedure described in Example 1 under a) is repeated with the modification that, in place of polyvinyl alcohol I, polyvinyl alcohol II is employed. The resulting emulsion is stable in the centrifuge test and has a mean particle size of 532 nm.

b) Preparation of Catalyst Component C2

The procedure described in Example 1 under b) is repeated with the modification that, in place of polyvinyl alcohol I, polyvinyl alcohol II is employed. The resulting emulsion is stable in the centrifuge test and has a mean particle size of 497 nm.

To prepare the crosslinkable emulsion 10 parts of crosslinking component C3, 10 parts of catalyst component C2 and 80 parts of water are mixed with one another. The procedure described in Example 5 is then carried out with the emulsion obtained in this way.

The results can be found in Tables 2–4.

Comparison Example 4
a) Preparation of Crosslinking Component C4

The procedure described in Example 1 under a) is repeated with the modification that, in place of polyvinyl alcohol I, polyvinyl alcohol II is employed. The resulting emulsion is stable in the centrifuge test and has a mean particle size of 452 nm.

To prepare the crosslinkable emulsion 10 parts of crosslinking component C4, 10 parts of the catalyst component C2 described in Comparison Example 3 under b) and 80 parts of water are mixed with one another. The procedure described in Example 5 is then carried out with the emulsion obtained in this way.

The results can be found in Tables 2–4.

Comparison Example 5
a) Preparation of Crosslinking Component C5

The procedure described in Example 5 under a) is repeated with the modification that the emulsifier employed comprises, in place of a mixture of a 20% strength aqueous solution of 120 parts of polyvinyl alcohol I and 5 parts of nonylphenyl polyglycol ether, only 120 parts of a 20% strength aqueous solution of polyvinyl alcohol II. The resulting emulsion is stable in the centrifuge test and has a mean particle size of 381 nm.

b) Preparation of Catalyst Component C3

The procedure described in Example 1 under b) is repeated with the modification that the emulsifier employed comprises, in place of a mixture of a 20% strength aqueous solution of 120 parts of polyvinyl alcohol I and 5 parts of nonylphenyl polyglycol ether, only 120 parts of a 20% strength aqueous solution of polyvinyl alcohol II. The resulting emulsion is stable in the centrifuge test and has a mean particle size of 487 nm.

To prepare the crosslinkable emulsion 10 parts of crosslinking component C5, 10 parts of catalyst component C3 and 80 parts of water are mixed with one another. The procedure described in Example 5 is then carried out with the emulsion obtained in this way.

The results can be found in Tables 2–4.

Comparison Example 6
a) Preparation of Crosslinking Component C6

The procedure described in Example 1 under a) is repeated with the modification that the emulsifier employed comprises, in place of a mixture of a 20% strength aqueous solution of 120 parts of polyvinyl alcohol I and 5 parts of nonylphenyl polyglycol ether, only 120 parts of a 20% strength aqueous solution of polyvinyl alcohol II. The resulting emulsion is stable in the centrifuge test and has a mean particle size of 395 nm.

To prepare the crosslinkable emulsion 10 parts of crosslinking component C6, 10 parts of the catalyst component C3 described in Comparison Example 5 and 80 parts of water are mixed with one another. The procedure described in Example 5 is then carried out with the emulsion thus obtained.

The results can be found in Tables 2–4.

TABLE 2

| | Paper "Buxil N 925" | | | Paper "Hifi Silco 609" | | |
|---|---|---|---|---|---|---|
| Example | Wetting | Rub-off | Shirla-stain | Wetting | Rub-off | Shirla-stain |
| 1 | very good | 1 | 1 | very good | 1 | 1 |
| 5 | very good | 6 | 2–3 | very good | 1 | 1–2 |
| C1 | very good | 1 | 3 | good | 1 | 2–3 |
| C2 | very good | 1 | 2 | good | 1 | 3 |
| C3 | very good | 6 | 2–3 | very good | 1 | 2 |
| C4 | very good | 3 | 1 | very good | 1 | 1 |

TABLE 2-continued

| | Paper "Buxil N 925" | | | Paper "Hifi Silco 609" | | |
|---|---|---|---|---|---|---|
| Example | Wetting | Rub-off | Shirla-stain | Wetting | Rub-off | Shirla-stain |
| C5 | severe flow disruption | 1 | 4 nonhomogeneous | severe flow disruption | 1 | 4 nonhomogeneous |
| C6 | severe flow disruption | 1 | 3–4 nonhomogeneous | severe flow disruption | 1 | 3 nonhomogeneous |

TABLE 3

| | Paper "Hifi Silco 691" | | | Paper "Agro Sol 87" | | |
|---|---|---|---|---|---|---|
| Example | Wetting | Rub-off | Shirla-stain | Wetting | Rub-off | Shirla-stain |
| 1 | very good | 1 | 1 | very good | 1 | 1 |
| 5 | very good | 1 | 1 | good | 1 | 2–3 |
| C1 | good | 1 | 1–2 | moderate | 1 | 3 nonhomogeneous |
| C2 | good | 1 | 2 | good | 1 | 2–3 nonhomogeneous |
| C3 | good | 1 | 2–3 | good | 1 | 3 nonhomogeneous |
| C4 | very good | 1 | 1 | very good | 1 | 1–2 |
| C5 | severe flow disruption | 1 | 5 | severe flow disruption | 1 | 5–6 nonhomogeneous |
| C6 | severe flow disruption | 1 | 4 nonhomogeneous | severe flow disruption | 1 | 4 nonhomogeneous |

TABLE 4

| | Paper "CMC-3" | | |
|---|---|---|---|
| Example | Wetting | Rub-off | Shirla-stain |
| 1 | very good | 1 | 1 |
| 5 | very good | 1 | 1–2 |
| C1 | good | 1 | 2–3 |
| C2 | good | 1 | 2 |
| C3 | good | 1 | 2 |
| C4 | very good | 1 | 1–2 |
| C5 | severe flow disruption | 1 | 5 nonhomogeneous |
| C6 | severe flow disruption | 1 | 3–4 nonhomogeneous |

What is claimed is:

1. An aqueous emulsion, comprising one or mor[e] organopolysiloxanes, an alkylphenyl polyglycol ether, an[d] polyvinyl alcohol with a degree of hydrolysis of not mor[e] than 85 mol-% and a molecular weight of from 2000 t[o] 500,000 g/mol.

2. The aqueous emulsion as claimed in claim 1, whic[h] contains organopolysiloxane resin.

3. The aqueous emulsion of claim 1, wherein the polyv[i]nyl alcohol has a degree of hydrolysis of between 65 and 8[5] mol-%.

4. The aqueous emulsion of claim 1, wherein the alk[y]lphenyl polyglycol ether is a compound of the gener[al] formula

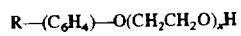

where

R is an alkyl radical having 4 to 15 carbon atoms and x is an integer from 5 to 30, and the phenyl group —(C₆H₄)— can be ortho-, meta- or para-substituted.

5. The aqueous emulsion of claim 1, wherein said polyvinyl alcohol and said alkylphenyl polyglycol ether are present in a weight ratio of 3:1 to 6:1.

6. The aqueous emulsion as claimed in claim 1, which is crosslinkable by the addition of Si-bonded hydrogen onto aliphatic multiple bond and comprises (A) organopolysiloxanes comprising radicals with aliphatic carbon-carbon multiple bonds, (B) organopolysiloxanes with Si-bonded hydrogen atoms or, instead of (A) and (B), (C) organopolysiloxanes comprising radicals with aliphatic carbon-carbon multiple bonds and Si-bonded hydrogen atoms, and (D) catalyst which promotes the addition of Si-bonded hydrogen onto aliphatic multiple bond, and, if desired, (E) inhibitor.

7. The aqueous emulsion as claimed in claim 6, wherein the organopolysiloxane (B) has a hydrogen content of at least one percent by weight.

8. The aqueous emulsion of claim 6, wherein the polyvinyl alcohol has a degree of hydrolysis of between 65 and 85 mol-%.

9. The aqueous emulsion of claim 6, wherein the alkylphenyl polyglycol ether is a compound of the general formula $$R-(C_6H_4)-O(CH_2CH_2O)_xH \quad (I)$$

where

R is an alkyl radical having 4 to 15 carbon atoms and x is an integer from 5 to 30, and the phenyl group —(C₆H₄)— can be ortho-, meta- or para-substituted.

10. The aqueous emulsion of claim 6, wherein said polyvinyl alcohol and said alkylphenyl polyglycol ether are present in a weight ratio of 3:1 to 6:1.

11. A process for preparing elastomers, which comprises applying the emulsion as claimed in claim 6 to a substrate and crosslinking it.

12. A coating which repels tacky substances prepared according to the process of claim 11.

* * * * *